May 16, 1961     L. D. SAVAGE, JR., ET AL     2,984,109
DEVICE FOR THE PROTECTION OF PRESSURE MEASURING ELEMENTS
Filed Oct. 15, 1958     2 Sheets-Sheet 1
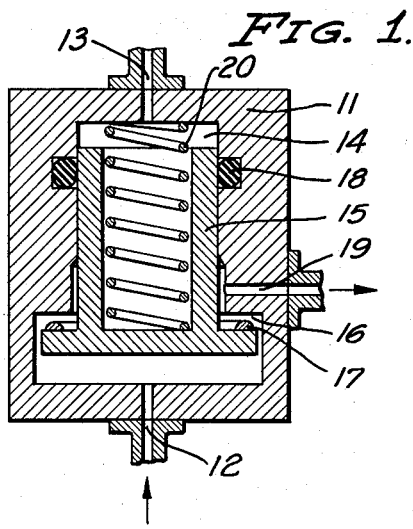
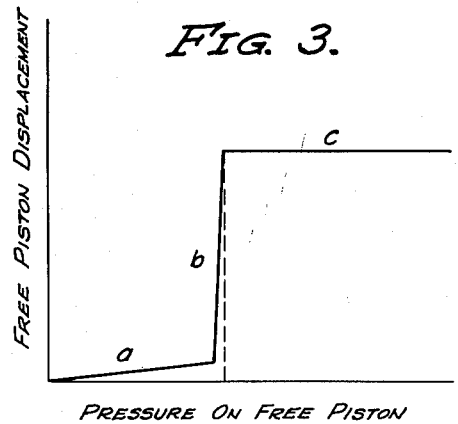
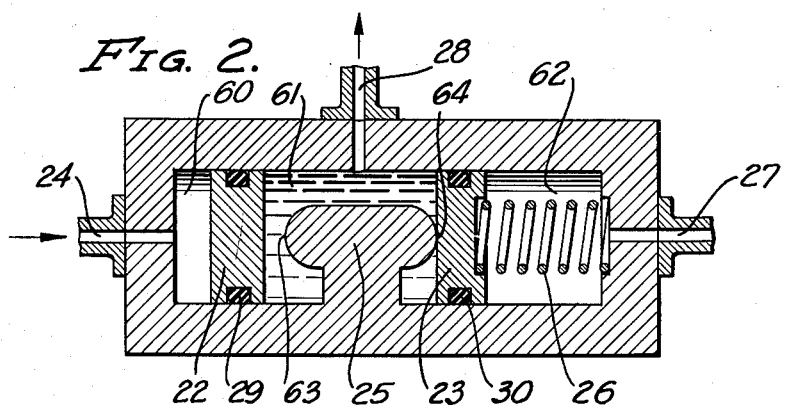
INVENTORS
LESTER D. SAVAGE JR.
MICHAEL E. STICKNEY
BY THEIR ATTORNEYS
HARRIS, KIECH, FOSTER & HARRIS

INVENTORS
LESTER D. SAVAGE JR.
MICHAEL E. STICKNEY

BY THEIR ATTORNEYS
HARRIS, KIECH, FOSTER & HARRIS

# United States Patent Office 2,984,109
Patented May 16, 1961

2,984,109

DEVICE FOR THE PROTECTION OF PRESSURE MEASURING ELEMENTS

Lester D. Savage, Jr., Costa Mesa, and Michael E. Stickney, Fullerton, Calif., assignors to Beckman Instruments, Inc., a corporation of California Filed Oct. 15, 1958, Ser. No. 767,467

7 Claims. (Cl. 73—388)

This invention relates to pressure measurements and, in particular, to devices for use in conjunction with pressure measuring instruments or devices for protection of the instruments against excessive pressures.

In measuring techniques, the protection of instruments against forces that are larger than the measuring range, but which may nevertheless inadvertently be applied to the instrument, forms a problem that has been dealt with in widely divergent ways.

The device of the invention may be used to advantage in combination with all types of pressure measuring elements, such as manometers, pressure balances, Bourdon tubes, and the like. It finds its main use in combination with pressure transducers, i.e., instruments that generate electrical signals in response to pressures to which they are exposed. The pressure limiting device of the invention is particularly useful in combination with differential pressure measuring elements, wherein the pressure difference may be small with respect to either of the applied pressures.

In the differential pressure type of instrument usually a resilient member is elastically deformed under the influence of the pressure exerted on two opposite faces of a diaphragm, a membrane or the like, whereby one pressure opposes the other such that the elastic deformation is a function of the difference in pressure. Under these circumstances the danger of exerting an unduly large pressure is extremely imminent because of the variations which may occur in either of the applied pressures. Furthermore, one of the pressures may be exerted while the other is not. Especially dangerous is the initial application of pressure or the discontinuing of a pressure when a differential measuring element is put in or taken out of operation, which may happen when the operation, plant or machinery to which the element is connected is started or stopped, or a connection between the element and a plant already in operation is made or disconnected. The pressures themselves may be several orders of magnitude larger than the difference which has to be measured. When one of the pressures is exerted during a very short time, even a small fraction of a second, the measuring element might be permanently damaged or at least the calibration lost by an excessive pressure.

Pressure limiting devices are known in the art, one such device being shown in longitudinal section in Fig. 1. A metal body 11 has an inlet opening or port 12 for the gas or liquid, the pressure of which has to be measured, and an outlet opening or port 13 giving access to the atmosphere or vacuum or another line. The body 11 has a bore hole 14 in which a valve 15 is slidably positioned. A valve seat 16 is formed in the body 11 and the valve 15 is provided with a ring of gasket material 17 for engaging the valve seat. An O-ring 18 positioned in a groove in the body secures hermetic sealing of the valve 15 in the hole 14. A helical compression spring 20 is positioned between the valve and one end of the body, pushing the valve away from its seat. A port 19 gives access through tubing to a pressure measuring instrument.

The operation of this device is as follows: When the pressure at the inlet opening 12 is less than a given value, which is determined by the characteristics of the spring 20 and the net surface area of the valve, the valve is displaced from its seat and there is an open path between the ports 12 and 19 such that the pressure at the port 12 can be measured by the measuring instrument connected to the port 19. However, when the inlet pressure increases to a given value, the valve is pushed towards its seat and the path between the ports 12 and 19 is shut off.

Devices of this type are not entirely satisfactory. The seal between the valve and its seat must be practically perfect before an absolute disconnection between ports 19 and 12 is achieved. This is mainly so because the fluid displacement necessary to cause an appreciable change in the pressure measuring element is usually very small. Therefore, even very small amounts of the fluid, the pressure of which has to be measured, which leak through the valve can cause excessive pressure on the element. Because of changes of conditions in the valve seat, the pressure at which a perfect sealing of the valve is achieved is not constant, and hence it is not possible to limit the maximum pressure which may be exerted at a pressure measuring element to a value only slightly higher than the normal measuring range. Normally an excess pressure of 40% of the range should be allowed with a device of this kind. This requirement leads to either an unnecessary restriction of the range of the instrument or to excessive pressures on the measuring element.

It is an object of the invention to provide a protection device that avoids the disadvantages of prior pressure limiting devices as used in combination with pressure measuring elements or pressure transducers. A further object of the invention is to provide a device by means of which the maximum pressure exerted on a measuring element can be accurately set or calibrated. Another object is to provide such a device which is not subject to changes in behavior due to changes in the sealing characteristics of valves and valve seats.

It is an object of the invention to provide a protection device that will limit the pressure that may be exerted at the exit port of the device, with the operation of the device not dependent upon close dimensional tolerances of the mechanical units of which it is composed.

It is an object of the invention to provide a pressure limiting device having an inlet pressure chamber, an outlet pressure chamber, and a measuring chamber positioned between the inlet and outlet chambers and filled with a relatively incompressible fluid, and inlet and outlet movable seals positioned between the inlet and measuring chambers and the measuring and outlet chambers respectively, with the outlet seal resiliently urged toward the inlet seal, and with a limiting bracket for limiting movement of each seal toward the other. A further object of the invention is to provide a pressure limiting device which may be used in conjunction with a second similar device in combination with differential pressure measuring instruments.

The invention also comprises novel details of construction and novel combinations and arrangements of parts, together with other objects, advantages, features and results, which will more fully appear in the course of the following description. The drawings merely show and the description merely describes preferred embodiments of the present invention which are given by way of illustration or example.

In the drawings:

Fig. 1 is a longitudinal sectional view of a known pressure limiting device;

Fig. 2 is a longitudinal sectional view of a preferred embodiment of the invention;

Fig. 3 is a graph illustrating the operation of the device of the invention;

Figure 4:
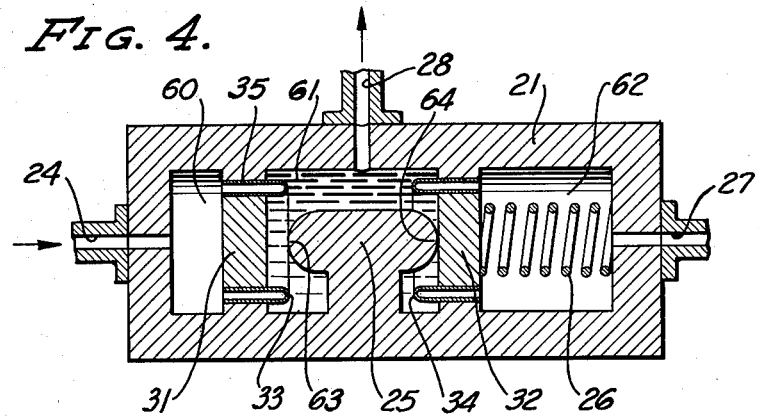
Fig. 4 is a longitudinal sectional view of an alternative embodiment of the invention.

Referring now to the structure of Fig. 2, a cylinder 21 is closed at both ends and pistons 22 and 23 are slidably positioned therein to define an inlet pressure chamber 60, a measuring chamber 61, an outlet pressure chamber 62. A high pressure port 24 connects the inlet chamber 60 and the vessel the pressure of which is to be measured. Located at about the central portion of the measuring chamber 61 is a stop bracket 25, the lengthwise ends of which provide stops or abutments 63, 64 for the pistons 22 and 23, respectively. The right piston 23 is pressed towards the stop 64 by a spring 26, the other end of the spring engaging an end of the closed cylinder 21. A port 27 is also provided in this end giving access to another pressure source or to the atmosphere or to a vacuum, depending on the range of pressures that are to be measured. A port or tube connection 28 provides a connection between the measuring chamber 61 and a pressure measuring element or transducer (not shown). The measuring chamber 61 is filled with a substantially incompressible liquid. Entry of the gas or liquid under pressure into the liquid filled space between the two pistons is prevented by an O-ring 29 in an annular recess in the piston 22, and leakage of said liquid to the chamber 62 or the atmosphere is prevented by a similarly installed O-ring 30 in the piston 23.

The operation of the device of Fig. 2 is as follows: The pressure exerted by the helical spring 26 on the right-hand piston 23 is chosen such that when the pressure existing in the measuring chamber 61 is lower than a certain value, the left-hand face of cylinder 23 will rest against the right-hand stop 64 of the bracket 25. The characteristic behavior of a pressure transducer and other pressure measuring devices, such as a Bourdon tube, is usually such that the displacement is relatively small over the entire pressure operating range. This characteristic is shown in Fig. 3, which is a graph depicting the displacement of the free piston 22 of the device of Fig. 2 in relation to pressure at the port 24.

When the pressure in the chamber 60 increases from zero to some value, the free piston moves only a little distance because of said typical behavior of pressure measuring devices, and the fact that the liquid of the chamber 61 enclosed by the two pistons and the pressure measuring element is virtually incompressible. This movement corresponds to portion $a$ of the curve of Fig. 3, which is the normal operating range of the device. At a pressure slightly lower than the maximum pressure to be exerted on the measuring element (intersection of portions $a$ and $b$), further increase of pressure results in a movement of the right-hand piston 23 compressing the spring 26, whereby the force exerted by the spring on the piston increases because the spring is now deformed. The piston 22 moves in conjunction with the piston 23, as shown in portion $b$ of the graph of Fig. 3. In this area both pistons move almost an equal amount because the measuring element permits only a small movement of the liquid through the tube connection 28 for a relatively large change in pressure. Finally, as the pressure in the chamber 60 increases further, the piston 22 contacts the left-hand stop 63 of the bracket 25 and no further movement of this piston can take place. This part of the behavior of the left piston 22 is shown by the portion $c$ of the graph of Fig. 3.

The device of the invention permits a very precise setting of the maximum pressure that can be exerted on the pressure measuring element. In contrast to prior devices, this setting is not dependent on the ratio between the pressure exerted and the sealing properties of a valve, but rather on the force exerted by the spring as compressed to a given length. Even without manual adjustment, a spring can be manufactured to provide a force within tolerances of less than 1%. Furthermore, the left piston 22 that travels a very short distance (portion $a$) during the time that the measuring device is operating within its range, travels a relatively large distance (portion $b$) in respect to pressure increments after the spring 26 becomes compressed and before the piston 22 contacts its stop. This travel differential can easily be enhanced by giving the spring 26 a large ratio between deformation and compression response thereto. Consequently, it should be clear that an accurate operation of the device is not greatly dependent on the initial position at zero pressure of the left-hand piston 22.

When the pressure to be measured is exerted in a large vessel or when the pressure of a gas or liquid stream is to be measured, it is generally not important that the total volume displacement needed for carrying out a measurement is small. In that case the piston 23 may leave the stop 64 before the highest point of the measuring range is attained, as long as the force exerted by the spring 26 equals the maximum admissible pressure exerted by the liquid body on the right-hand piston 23 at the time the free piston 22 contacts its stop. Referring to the graph of Fig. 3, this means that under the circumstances described, the intersection of the portions $a$ and $b$ of the curve may be located at a pressure lower than the maximum pressure.

However, it is sometimes necessary to measure a pressure that is exerted in a vessel of limited dimensions. Under these circumstances it is important that the volume displacement of the measuring device be negligible, and certainly the existence of two ratios of incremental volume displacement and pressure increment in the same device would be utterly inconvenient and lead to inaccuracies. Under this condition, the point of disengagement of the piston 23 and the stop 64 becomes very important. It is now necessary that the measuring range be lower than the intersection of portions $a$ and $b$ of the graph, or in other words, the piston 23 must leave its stop only at pressures slightly higher than the measuring range.

When the maximum pressure to be exerted in the liquid body and upon the measuring element must still be only slightly higher than the maximum pressure of the measuring range, it is necessary that portion $b$ of the graph become a nearly vertical line. This can be achieved first by reducing the clearance between the piston 22 and the left-hand stop 63, and, secondly, by giving the spring 26 a large ratio between form change and force change. In terms of a helical compression spring this would simply mean that a coil spring is used that is very much longer, preferably several times longer in the uncompressed state than at the time piston 23 leaves its abutment. A very small pressure increase will then suffice to bring piston 22 to its stop.

It should be clear, however, that the same effect can also be achieved by a spring of different type, i.e., one that shows essentially a nonlinear relationship between the length and the force exerted by the spring. Such springs are, for instance, used in micro switches. When a force exerted on a spring of this type is lower than a given value, the spring responds by relatively small dimensional changes but on or over this given value the spring suddenly yields with a relatively large dimensional change. Many forms of springs of this type are known in the art and they need not be described here in any detail.

An alternative embodiment of the invention using flexible diaphragms instead of such pistons is shown in Fig. 4 wherein elements identical to those of Fig. 2 are identified by the same reference numerals. The operation of this device is analogous to that of the device depicted in Fig. 2. Discs 31 and 32 are movably supported in the cylinder 21 by thin diaphragms 33, 34 fastened to ring-shaped projections 35, 36, respectively, of the cylinder. The diaphragms 33, 34 are very thin-walled metal bodies, each in the form of the shell of a toroid which is halved along its plane of symmetry. Because of the thinness of the diaphragms, the discs 31, 32 may be moved over a small distance without much effort, while a perfect seal is maintained between the chambers 60 and 61 and the chambers 61 and 62. Furthermore, diaphragms of this type have the advantage of very little frictional resistance. The small amount of hysteresis that may occur on deformation is usually negligible with suitable materials.

The operation of the pressure limiting device of Fig. 4 is exactly the same as that of Fig. 2. Therefore, the device is not dependent on any close mechanical tolerances beyond those already explained for the spring.

Figure 5:
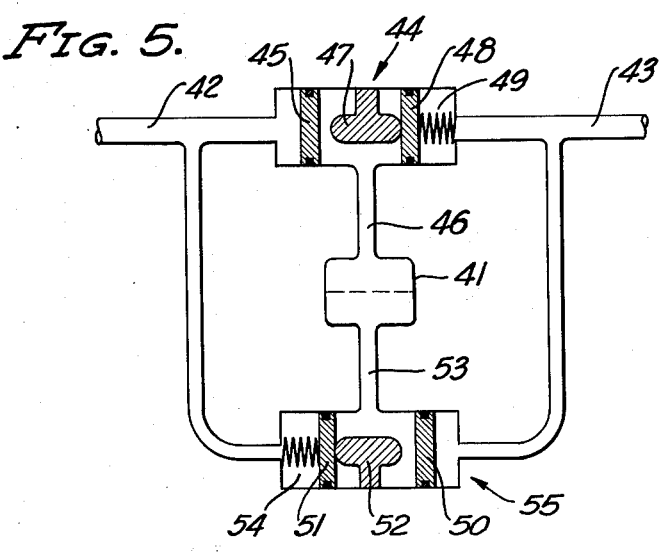
Fig. 5 is a diagram illustrating operation of two devices of the invention in conjunction with a differential pressure measuring element.

Fig. 5 illustrates how two protection devices of the invention can be used with a differential pressure measuring element. A transducer or other pressure measuring element 41 measures the pressure between the points 42 and 43, either of which may have the higher pressure. In this type of connection, very often the differential pressure to be measured will be a small fraction of either of the individual pressures. When for some reason, even during a very short period, either pressure is applied singly, the pressure measuring element may be permanently damaged or at least thrown out of its calibration. The arrangement of Fig. 5 prevents such damage. Two pressure limiting devices 44, 55 are connected in opposite orientations on opposite sides of the pressure measuring element 41. Each of these devices may be identical to the device of Fig. 2.

Let it be assumed first that the pressure at 42 would be much higher than that at 43. The drawing shows that in a normal situation the amount of fluid contained between the measuring element 41 and the two pistons 45, 48 of the limiting device 44 is such that the free piston 45 is free of engagement with stop bracket 47. The piston 48 is pushed against the stop bracket 47 by spring 49. In case the pressure on the line 42 is high first, the free piston 45 moves, substantially together with the spring tensioned piston 48, to the right until the piston 45 hits the bracket 47, after which no fluid can move in channel 46 towards the measuring element 41.

In the opposite situation, when the pressure in line 43 is higher, piston 50 of the protection device 55 first moves, substantially together with piston 51, until it hits the right end of stop bracket 52, and again no damage of the measuring element 41 can occur since there is no excessive fluid displacement in channel 53. Therefore, it is seen that under no circumstances may the measuring element be subjected to excessive strain. The amount of pressure that may be applied to the measuring element from either side can be accurately set by suitably constructing the springs 49 and 54 as described above.

Although exemplary embodiments of the invention have been disclosed and discussed, it will be understood that other applications of the invention are possible and that the embodiments disclosed may be subjected to various changes, modifications and substitutions wthout necessarily departing from the spirit of the invention.

We claim as our invention:

1. A pressure limiting device including: means defining an inlet pressure chamber; means defining an outlet pressure chamber; means defining a measuring chamber positioned between said inlet pressure chamber and said outlet pressure chamber, said measuring chamber being filled with a relatively incompressible fluid; an inlet seal movably positioned between said inlet and measuring chambers; an outlet seal movably positioned between said measuring and outlet chambers; means for resiliently urging said outlet seal toward said inlet seal until a predetermined value of pressure is reached within said measuring chamber, at which pressure said outlet seal overcomes the resilience of said means and moves away from said inlet seal so as to prevent the pressure from increasing within said measuring chamber beyond said predetermined value; and stop means carried within said measuring chamber for limiting movement of each of said seals toward the other.

2. In a device for transmitting the difference between a high and a low pressure to a pressure measuring element except when the difference in pressure exceeds a given value, the combination of: a vessel having first and second movable elements therein, said vessel having a connection to the pressure measuring element; a body of liquid bounded and hermetically sealed by said movable elements, said vessel and the pressure measuring element, with the side of said first movable element remote from said liquid exposed to said high pressure, and with the side of said second movable element remote from said body of liquid exposed to said low pressure; a stop member cooperating with said movable elements to limit movements thereof in the direction of displacement of said body of liquid towards the measuring element; and resilient means tending to force said second movable element in the direction of said body of liquid, the force exerted by said resilient means on said second movable element at the time said first movable element contacts said stop member cooperating with the low pressure exerted on said second movable element to counteract the pressure exerted on said second element by said liquid body for limiting the difference between the pressure in said body of liquid and the low pressure to a value which is equivalent to the maximum pressure difference to be exerted upon the pressure measuring element.

3. In a device for protecting a pressure sensitive element against pressure higher than a given value, the combination of: a vessel with an opening for connection to the pressure sensitive element; first and second movable elements disposed within said vessel; a body of liquid hermetically sealed in said vessel and bounded by said first and second movable elements, said opening providing communication between said body of liquid and the pressure sensitive element; a stop for said first movable element and carried in said vessel for limiting the displacement of said first element in the sense of increasing pressure in said body of liquid; and spring means for urging said second movable element towards increasing pressure in said body of liquid, said spring means being adapted to counteract a pressure equal to said given value when said first movable element contacts said stop under the influence of a pressure that is equal to said given value.

4. In a device for protecting a pressure measuring element that undergoes displacement in response to pressure against pressure higher than a given value, the combination of: a vessel having an open connection to the pressure measuring element; a body of substantially incompressible fluid contained in said vessel; first and second fluid displacement means positioned within said vessel and adapted to effect displacement and sealing of said fluid in said vessel, with said first fluid displacement means exposed to the pressure to be measured, and with said second fluid displacement means exposed to a reference pressure lower than said pressure to be measured; stop means fixed relative to said vessel for limiting that movement of said fluid displacement means which tends to decrease the volume of said liquid body; and spring means engaging said second fluid displacement means and urging said second displacement means in a direction to decrease the volume of said liquid body, with the volume and linear displacement undergone by the measuring element in response to a given pressure being small in comparison to the volume and linear displacement undergone by said second fluid displacement means in response to the same pressure, so that volume displacements of the first and second fluid displacement means are closely linked together, said spring means being adapted for exerting a pressure equal to said given value when the movement of said first fluid displacement means is restricted by said stop means.

5. In a device for protecting a pressure sensitive element against pressures higher than a given value, the combination of: a vessel with an open connection to the pressure sensitive element; a body of liquid disposed in said vessel; first and second fluid displacement means carried by said vessel and adapted to effect volume displacement of said body of liquid and hermetically seal said liquid in said vessel; stop means for said first fluid displacement means adapted to restrict the movement of said fluid displacement means under the influence of a high pressure exerted at said fluid displacement means at the side remote from said liquid body; and spring means engaging said second fluid displacement means for counteracting the pressure exerted on said second fluid displacement means by said body of liquid, said spring means providing a ratio between linear displacement of said second fluid displacement means and pressure change in said liquid body, with the displacement in response to pressure change undergone by the sensitive element being small in comparison to the linear displacement in response to pressure change undergone by said second fluid displacement means so that said first and second fluid displacement means move concurrently, and said spring means being chosen so that the pressure in said body of liquid equals said given value when the movement of said first fluid displacement means is restricted by said stop means.

6. A device as defined in claim 5, including: second stop means for limiting movement of said second fluid displacement means under the influence of said spring means when the pressure exerted on said first fluid displacement means does not exceed a value slightly higher than the highest value of the measuring range, whereby the fluid displacement volume of the first fluid displacement means is equal to the volume displacement undergone by the pressure sensitive element throughout its range, so that the pressure to be measured is not substantially affected by volumetric change in said vessel.

7. In a system for measuring the difference between pressures on first and second lines, the combination of: a differential pressure measuring element having first and second inlet openings; and first and second pressure limiting devices, each of said devices having an inlet port, an outlet port and a measuring port, with said first line connected to the inlet port of said first pressure limiting device and the outlet port of said second pressure limiting device, said second line connected to the inlet port of said second pressure limiting device and the outlet port of said first pressure measuring instrument, the measuring port of said first pressure measuring device connected to said first inlet opening, and the measuring port of said second pressure measuring device connected to said second inlet opening, and with each of said pressure limiting devices including: means defining inlet, measuring and outlet chambers, with a first movable seal between the inlet and measuring chambers and a second movable seal between the measuring and outlet chambers, with the inlet port communicating with the inlet chamber, the outlet port communicating with the outlet chamber and the measuring port communicating with the measuring chamber; a substantially incompressible fluid filling the measuring chamber; a stop for limiting movement of said first seal toward said second seal; and a spring urging said second seal toward said first seal.

References Cited in the file of this patent

UNITED STATES PATENTS

| | | |
|---|---|---|
| 2,374,523 | Beecher | Apr. 24, 1945 |
| 2,632,474 | Jones | Mar. 24, 1953 |